United States Patent [19]

Fahlesson

[11] 4,234,904
[45] Nov. 18, 1980

[54] PROCESS AND DEVICE FOR THE PROTECTION OF ELECTRICAL ENERGY SUPPLY SYSTEMS CONTROLLED BY MEANS OF AUDIO-FREQUENCY

[75] Inventor: Kjell T. Fahlesson, Tyreso, Sweden

[73] Assignee: LGZ Landis & Gyr Zug AG, Switzerland

[21] Appl. No.: 58,617

[22] Filed: Jul. 18, 1979

[30] Foreign Application Priority Data

Jul. 19, 1978 [CH] Switzerland ............... 7775/78

[51] Int. Cl.³ .................................. H01H 47/26
[52] U.S. Cl. ..................... 361/165; 361/182; 361/195; 361/106; 307/39
[58] Field of Search ......... 361/165, 195, 182, 183, 361/106; 307/39, 41, 200 A, 296

[56] References Cited

U.S. PATENT DOCUMENTS

| | | | |
|---|---|---|---|
| 2,739,270 | 3/1956 | Edwards et al. | 307/41 |
| 3,359,551 | 12/1967 | Dennison | 307/39 |
| 3,486,080 | 12/1969 | Tillmann | 361/165 |
| 3,702,418 | 11/1972 | Obenhaus | 361/106 |
| 3,770,977 | 11/1973 | McIntosh | 307/41 |

*Primary Examiner*—J. D. Miller
*Assistant Examiner*—L. C. Schroeder

[57] ABSTRACT

A process for the protection of electrical systems upon return of power after power interruptions, through the immediate disconnection of secondary consuming units by an audio-frequency control receiver, and the subsequent reconnection thereof in timed sequence. The audio-frequency control receivers have, in addition to a normal control path, a second path, through which, upon return of the voltage, the switch relay for secondary consuming units is disconnected upon reaching ⅔ of the system voltage. The process may be implemented through the use of a two-state D.C. relay, which is controlled by a secondary path including a cold lead to the system voltage. The process may alternatively be implemented through the use of a two-state A.C. relay which is controlled through a half-wave secondary path including a capacitor/resistor parallel circuit.

7 Claims, 2 Drawing Figures

PROCESS AND DEVICE FOR THE PROTECTION OF ELECTRICAL ENERGY SUPPLY SYSTEMS CONTROLLED BY MEANS OF AUDIO-FREQUENCY

BACKGROUND OF THE INVENTION

As is known, audio-frequency controls in energy supply systems must undertake the task of optimizing the lead curve (load management) through the connection and disconnection of energy consuming units, as well as tariff stages of the measuring equipment. Street lights, traffic signals, alarm equipment, and the like can be similarly controlled.

In space heating systems, which are loaded to their full capacity limits, the reconnection of the system after a longer voltage interruption, may be made more difficult by the fact that all heating regulation devices which were simultaneously connected show a maximum inadequacy gap in heat loads. Likewise, an emergency voltage group present can be overcharged by the existing load.

The reconnection of the system or system component is made significantly easier, when the audio-frequency commands to add to a fully loaded system are ignored before any actuation of the system protection switches.

One object of the invention is to significantly accelerate the system reconstruction of an electrical supply system controlled by means of an audio-frequency commmand upon return of the voltage after system interruption or in the case of an as yet dormant system, to initiate its operation.

DETAILED DESCRIPTION OF THE INVENTION

Figure 1:
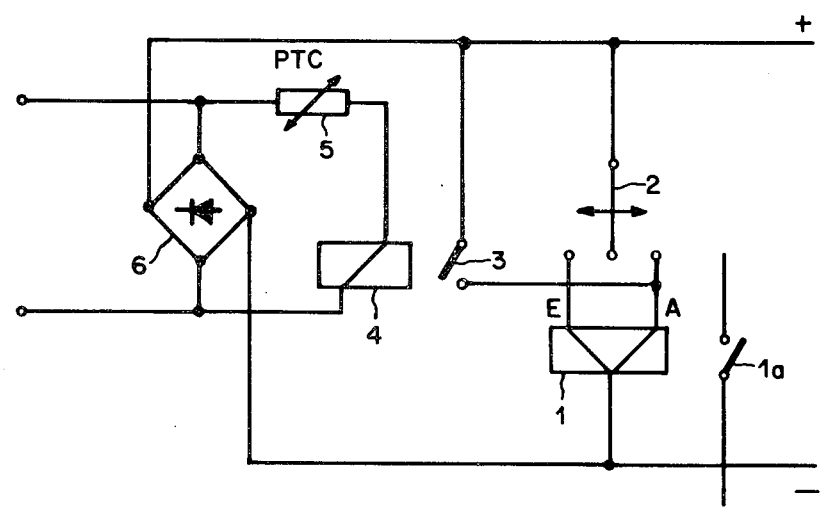
FIG. 1 illustrates one embodiment of the invention, utilizing a two-state direct current relay.

FIG. 1 illustrates a two-state D.C. relay generally indicated for executing commands in an audio-frequency control receiver with an input E for "On" commands and an input A for "Off" commands. This relay 1 is connected, for example, through the deflection of a contact armature 2 with one of the positive D.C. sources in FIG. 1 by means of a camplate (not shown) or by means of a rotating selection disk (also not shown). A second control path for the "Off" position of relay 1 is made possible through switch contact 3, which is controlled by relay 4. This relay 4 is connected directly to one of the first A.C. terminals connected with the system, and, also to the second A.C. terminals by means of a cold lead (positive temperature coefficient resistance) 5. The D.C. source for the operation of two-state relay 1 can be formed through a full-wave rectifier 6 connected between the D.C. terminals.

Figure 2:
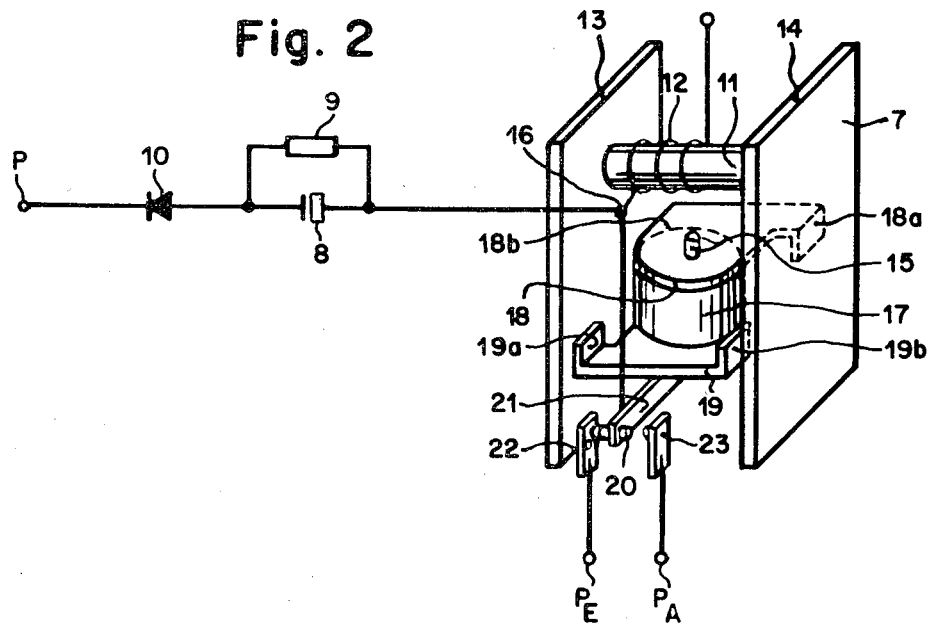
FIG. 2 illustrates a different embodiment, which utilizes a two-state A.C. relay, operable by means of a half-wave alternating current input.

FIG. 2 illustrates a two-state A.C. relay 7 operable by means of an A.C. half-wave; a second control path consists of capacitor 8 in parallel with a resistor 9 and a diode 10 in series with such parallel circuit. The diode is also connected to terminal P of the energy supply system.

A.C. relay 7 has an iron core 11 with its energizing coil 12 fastened between two pole shoes 13 and 14. An armature, having an axis 15 embedded in a base plate (not shown) is also located between the pole shoes 13 and 14. The armature consists of a permanent magnet 17 magnetizied in the longitudinal direction of axis 15, an upper pole plate 18 and a lower pole plate 19. Movable contact 20 with its activation armature 21 is fastened to the carrier of the magnet system. Movable contact is associated with stationary contacts 22 (PE) and 23 (PA).

In audio-frequency control receivers, according to the invention, consuming units with secondary priorities, (such as storage heating, luminous advertising or certain direct heating units,) are automatically disconnected upon the return of the system voltage after a voltage interruption. Only after assured reconstruction of the energy supply in the system line are the disconnected secondary consumption units reconnected, in timed sequence, through separate audio-frequency control signals. For this purpose, an additional path is provided, through which an impulse is transmitted upon the return of the system voltage where it reaches a threshold of less than $\frac{2}{3}$ of the system voltage. The impulse is transmitted through the relevant switch relay in such direction that it is turned "Off", or if it were already off it remains so. This path is in addition to the normal control path in audio-frequency control receivers, and removes loads of secondary importance. This relay is restored to the "On" position after a subsequent "On" audio-frequency control command, in timed sequence.

The embodiment illustrated in FIG. 1, utilizing a two-state switch relay 1 in D.C. design, is connected in the usual manner through contact arm 2 at the time corresponding to the individual audio-frequency control command with "On" input E or "Off" input A. Contact 1a, controlled through the two-state relay is closed or opened through said contact arm 2. If the power is interrupted, relay 1 thus remains in the position corresponding to the last command sent. Upon return of the voltage, all loads connected before the current interruption remain connected. In rapid response systems this can result in the disconnection of the system line immediately upon the return of the system voltage through the protection switch because of overload, and reconnection is then rendered impossible, at least for longer periods. In order to avoid this problem, a second path is provided for the control voltage of relay 1 through contact 3. Upon the return of the interrupted system voltage, relay 4 is immediately advanced before the full system voltage is attained. This relay 4 and the cold lead 5 (positive temperature coefficient resistance) connected in its supply line operate such that the low current flowing after a certain period through the warming of the cold lead can no longer be maintained; and contact 3, which is closed, is thus re-opened.

During a certain minimal interval which exceeds several system frequency periods following return of the supply voltage, contact 3 is closed and a current impulse is supplied to the "Off" input A of relay 1. As a result, the secondary load is rejected by means of relay contact 1a. The time constants of the system are set so that a very short system interruption (e.g., on the order of less than 30 seconds) has no effect on the operation of the system. On the other hand, relay 4 and cold lead 5 are selected in such manner that this relay de-energizes safely within the period prior to receipt of the next possible task of the audio-frequency control command. Thus, the normal operation of two-state switch relay 1 is again guaranteed and the normal commands can again be executed, even if this should again be an "On" command for relay contact 1a.

In order to explain the operation of the device according to FIG. 2, the operation of relay 7 must first be explained. In the position shown and without current flow in coil 12, the permanent magnet forms a closed ferrous magnetic circuit through pole shoe seat 18a, iron core 11 and pole shoe seat 19a, and produces therein a magnetic flux. If an A.C. current is supplied to coil 12 through closed contacts 22 and 20, the armature remains in the position shown until the A.C. half-wave appears in the coil, the magnetic flux of which is in opposition to the magnetic flux in permanent magnet 17 in iron core 11. This causes the armature to rotate until pole shoe seat 18b contacts pole shoe 13 and pole shoe seat 19b contacts pole shoe 14. Activation armature 21 rotates to open contacts 22 and 20 and coil 12 is without current. The armature remains in the newly-attained position since nowclosed contacts 23 and 20 are without voltage at this time. If, in the framework of another command, A.C. voltage is supplied to coil 12 by means of contact 23 and 20, the armature is returned to the position shown, in a similar fashion to the process described above, and contacts 22 and 20 are closed. A pre-requisite for the correct operation of relay 7 is that the reconnection takes place in a significantly shorter interval than a half-period of the system voltage.

An extension of activation armature 21 (not shown) directly controls a set of power contacts, which make possible the connection of the consumption devices to be influenced by means of output terminals of the audio-frequency control receiver.

In order to guarantee the protection of the system upon return of the system voltage, the connection point 16 of coil 12 is provided with a second path for the activation impulse. This second path consists of capacitor 8, resistor 9 and diode 10 as described above. This path is connected with phase lead P, and the diode is so polarized and resistor 9 so selected that upon return of the system voltage to a maximum threshhold of ⅔ full system voltage, an impulse is transmitted to connection point 16 in such manner that A.C. relay swings into the "Off" position upon the first corresponding half-wave of the system voltage, if it was previously in the "On" position, or remains in the "Off" position, if it were already in this position.

The time constant for the impulse length is determined through the size of capacitor 8 and resistor 9. The device according to FIG. 2 is extremely simple and because of the omission of relay 4, economically advantageous. The effects and protection effects are the same as those of the device according to FIG. 1.

I claim:

1. A process for the protection of electrical energy supply systems by means of audio-frequency signals upon the return of voltage after interruptions of the voltage, wherein the consuming units with secondary priorities upon return of the system voltage, are cut off automatically at a threshold which is a maximum of ⅔ of the system voltage through the audio-frequency control receiver, and that these consuming units are reconnected in a time sequence order after assured reconstruction of the energy supply by audio-frequency control signals.

2. Apparatus for protecting electrical energy supply systems wherein supply to secondary loads is normally controlled by means of audio-frequency signals, said apparatus comprising
   a two-state switching relay,
   a normal control path coupled to said relay for controlling the state of said switching relay under normal conditions to control the secondary loads, and
   an additional control path coupled to said relay to momentarily energize said relay in a direction which momentarily assures disconnection of the secondary loads, prior to reaching ⅔ maximum supply voltage following interruption of the electrical energy supply.

3. Apparatus according to claim 2 wherein said two-state switching relay is a D.C. relay, and wherein said additional path includes a second relay and a cold lead, through the switch contacts of said second relay, and operation of said second relay being controlled by means of said cold lead.

4. The apparatus of claim 2 wherein said two-state switching relay is an A.C. relay operated through a half-wave of the system voltage.

5. The apparatus of claim 4 wherein said additional control path includes a parallel circuit including a capacitator, a series diode, and a resistor, said additional control circuit being connected between said A.C. relay and a system supply terminal.

6. The apparatus of claim 5, wherein said capacitator and said resistor are selected so that the frequency of the switching of said switching relay is several times less than the system frequency.

7. The apparatus according to claim 2, wherein time constants of said additional control path are so selected that an interruption of the system of less than 30 seconds has no effect.

* * * * *